United States Patent Office 2,789,937
Patented Apr. 23, 1957

2,789,937
CHROMONYL-3-(4-HYDROXYCOUMARINYL-3)-METHANE

Karel Fučík, Tocna-Komorany, and Miloš Hořický, Prague, Czechoslovakia, assignors to Spofa, spojene farmaceuticke zavody, Prague, Czechoslovakia, a corporation of Czechoslovakia No Drawing. Application February 14, 1955, Serial No. 488,166

Claims priority, application Czechoslovakia April 27, 1954

4 Claims. (Cl. 167—46)

The structure of the bis-derivatives of 4-hydroxycoumarin, e. g. 3,3'-methylene-bis-(4-hydroxycoumarin) and its homologues has been described by L. P. Link in J. Biol. Chem. 138,513 (1941), as consisting of two coupled 4-hydroxycoumarin nuclei both showing the 4-hydroxycoumarin-2,4-diketochromane tautomery

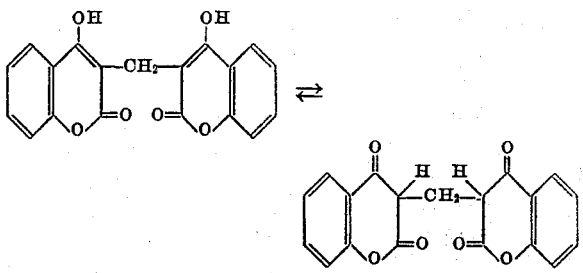

This theory has hindered further advance in the synthesis of new anticoagulants, as has also another theory found by Arndt, based upon the application of the chromone-coumarin tautomery, in the case of both nuclei of the bis-derivatives of 4-hydroxycoumarin.

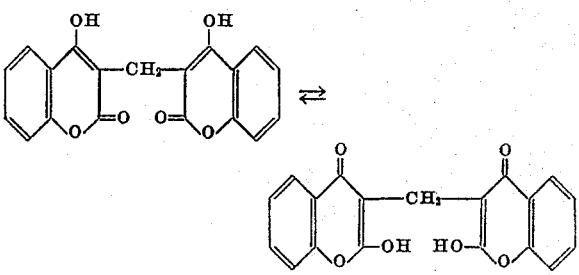

These two theories, presuming that the two joined nuclei are equal in their behavior, disagree with many reactions of the bis-derivatives and with the inactivity of 4-hydroxycoumarin as contrasted with the high activity of some of its bis-derivatives. Accordingly, synthesis based upon said conceptions yielded inactive or weakly active products only, for instance 3,3'-methylene-bis-(chromonyl)-methane or 3,3'-methylene-bis-diketochromane.

Experimental work on the constitution of bis-derivatives of 4-hydroxycoumarin by K. Fučík has shown that the two coupled nuclei in said bis-derivatives are not equivalent and that their behaviors are substantially different. This experimental work has been published in part in Chem. Listy 45, 460 (1951) and 45, 496 (1951) and 46, 190 (1952). According to this literature one nucleus exhibits reactions of a chromone nucleus and the other exhibits reactions of a coumarin nucleus. This can be explained by the following formula.

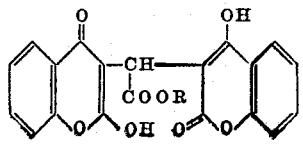

This conception of the structure of the bis-derivatives of 4-hydroxycoumarin facilitated further development in the field of anticoagulant synthesis leading to several highly active substances one of which is the subject of the present invention.

The present invention therefore relates to said new highly active substance (having a high anti prothrombic or anti-coagulant activity) and to a method for the preparation of the same by cyclizing 3-(ω-salicoyl-ethyl)-4-hydroxycoumarin of the formula

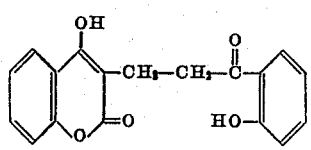

so that it is reacted with a formic acid ester and metallic sodium to the formation of chromonyl-3-(4-hydroxycoumarinyl-3)-methane in the form of its sodium salt. The free compound can be liberated by acidification.

The process is shown by the following reaction equation.

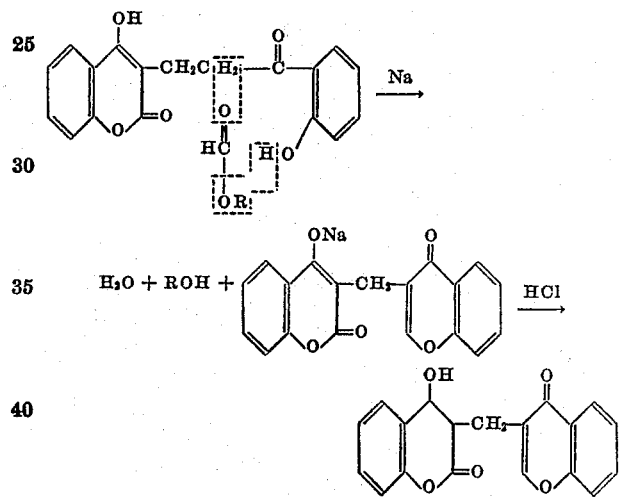

The process is illustrated by the following specific example.

31 g. of 3-(ω-salicoyl ethyl)-4-hydroxycoumarin is suspended in ethyl formate and 4.5 mols (10.35 g.) of sodium wire is added and the mixture allowed to stand at room temperature. The resulting precipitate which is the sodium salt of the product is separated by filtering with suction and dissolved in water, and the solution filtered and the filtrate acidified with HCl to pH 3. The resulting precipitate is washed and dried. The yield is 29.6 g. i. e. 93% of the theoretical yield. The product chromonyl-3-(4-hydroxycoumarinyl-3)-methane crystallizes well from acetic acid and from pyridine.

By paper chromatography in a butanol-water-ammonia system the substance yields in downward arrangement $R_F$ 0.69–0.71. It shows no fluorescence in short wave light.

The detection of the compound can be performed by the method described by K. Fučík in Chem. Listy 46, 190 (1952).

The product may be used as such or in the form of its water soluble salts.

In the above disclosure reference to chromonyl-3-(4-hydroxycoumarinyl-3)-methane is to be understood to embrace both the free acid and its salts.

Chromonyl-3-(4-hydroxycoumarinyl-3) - methane exhibits a very high and protracted anticoagulant activity which can be counteracted by administration of vitamin K. Its toxicity is comparatively low. It can be used as rodent poison and has been found to be more effective than the known 3-acetonyl-4-hydroxycoumarin and has the advantage that it is tasteless. Bait can be prepared by sprinkling a suitable food material with a solution of the sodium or ammonium salt of the chromonyl-3-(4-hydroxycoumarinyl-3)-methane or the substance can be mixed with the material from which the bait is made.

We claim:

1. Process which comprises reacting 3-(ω-salicoylethyl)-4-hydroxycoumarin with an ester of formic acid and sodium.

2. Chromonyl-3-(4-hydroxycoumarinyl-3)-methane.

3. A water soluble salt of chromonyl-3-(4-hydroxycoumarinyl-3)-methane.

4. A rodenticide comprising chromonyl-3-(4-hydroxycoumarinyl-3)-methane and a bait material.

References Cited in the file of this patent

FOREIGN PATENTS 568,858     Great Britain _____ Apr. 24, 1945

OTHER REFERENCES

Elderfield: "Heterocyclic Compounds," vol. 2, pp. 230–232, John Wiley and Sons, Inc., N. Y., 1951.